United States Patent
Jung

(10) Patent No.: US 9,526,071 B2
(45) Date of Patent: Dec. 20, 2016

(54) METHOD AND APPARATUS FOR OPERATING WAKE ON WLAN

(71) Applicant: Samsung Electronics Co. Ltd., Suwon-si, Gyeonggi-do (KR)

(72) Inventor: Bu-Seop Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 408 days.

(21) Appl. No.: 14/027,480

(22) Filed: Sep. 16, 2013

(65) Prior Publication Data

US 2014/0078950 A1    Mar. 20, 2014

(30) Foreign Application Priority Data

Sep. 20, 2012 (KR) ........................ 10-2012-0104770

(51) Int. Cl.
*H04W 52/02* (2009.01)
*H04Q 7/00* (2006.01)
*H04L 12/56* (2006.01)
*H04K 1/00* (2006.01)

(52) U.S. Cl.
CPC ................. *H04W 52/0235* (2013.01)

(58) Field of Classification Search
CPC ...... H04W 88/06; H04W 84/12; H04W 36/14; H04W 12/06; H04W 76/02; H04W 36/08; H04W 48/20; H04W 72/02; H04W 76/025; H04W 88/08; H04W 36/00
USPC ........................ 370/331, 338; 455/436, 442
See application file for complete search history.

(56) References Cited

U.S. PATENT DOCUMENTS

| | | | |
|---|---|---|---|
| 2002/0085719 A1* | 7/2002 | Crosbie | H04W 36/0011 380/248 |
| 2004/0088550 A1* | 5/2004 | Maste | H04L 63/101 713/182 |
| 2007/0206535 A1* | 9/2007 | Sood | H04W 12/10 370/331 |
| 2008/0076423 A1* | 3/2008 | Lee | H04W 36/08 455/436 |
| 2008/0192696 A1* | 8/2008 | Sachs | H04W 36/02 370/331 |
| 2008/0220769 A1 | 9/2008 | Qi et al. | |
| 2008/0220770 A1 | 9/2008 | Qi et al. | |
| 2009/0067397 A1* | 3/2009 | Seok | H04L 12/24 370/338 |
| 2009/0203379 A1* | 8/2009 | Karaoguz | H04W 36/32 455/436 |

(Continued)

FOREIGN PATENT DOCUMENTS

JP    2010-520653 A    6/2010

*Primary Examiner* — Mohamed Kamara
*Assistant Examiner* — Will Lin
(74) *Attorney, Agent, or Firm* — Jefferson IP Law, LLP

(57) ABSTRACT

A method of connecting to a network by a terminal in a communication system, the communication system including the terminal, one or more access points, and a network controller controlling the one or more access points is provided. The method includes establishing a connection with a first access point, setting and storing wake-up information, configured to selectively transceive with the first access point, in the first access point and the network controller, performing hand off to a second access point connected to the network controller, and selectively transceiving data with the second access point based on the wake-up information set and stored in the network controller.

10 Claims, 5 Drawing Sheets

(56) References Cited

U.S. PATENT DOCUMENTS

| | | | | |
|---|---|---|---|---|
| 2010/0120434 A1* | 5/2010 | Hasegawa | ............ | H04W 36/02 455/436 |
| 2010/0279692 A1* | 11/2010 | Hapsari | ................ | H04W 36/02 455/436 |
| 2011/0216692 A1* | 9/2011 | Lundsgaard | .......... | H04W 48/20 370/328 |

* cited by examiner

| Element ID | Length | TFS ID | TFS Action Code | TFS Subelement Count | TFS Subelements |
|---|---|---|---|---|---|
| 1 | 1 | 1 | 1 | 1 | 1 |

| Subelements ID | Length | TCLAS Element | TCLAS Processing Elements |
|---|---|---|---|
| 1 | 1 | 1 | 1 |

FIG.3

| Element ID | Length | TFS Status Subelements |
|---|---|---|
| 1 | 1 | 1 |

| TFS Response Status | TFS ID |
|---|---|
| 1 | 1 |

FIG.4

METHOD AND APPARATUS FOR OPERATING WAKE ON WLAN

CROSS-REFERENCE TO RELATED APPLICATION(S)

This application claims the benefit under 35 U.S.C. §119(a) of a Korean patent application filed on Sep. 20, 2012 in the Korean Intellectual Property Office and assigned Serial No. 10-2012-0104770, the entire disclosure of which is hereby incorporated by reference.

TECHNICAL FIELD

The present disclosure relates generally to a communication technique. More particularly, the present disclosure relates to a method and an apparatus which can decrease current consumption of a wireless LAN.

BACKGROUND

Decreasing power consumption of a Wi-Fi terminal has become a most significant issue in today's world.

In order to decrease the power consumption of the Wi-Fi terminal, various methods and technologies have been proposed. One such technology involves a Wake on WLAN technology for minimizing an operation section of a terminal, in which the terminal is activated only in a section requiring data transmission/reception to operate an Access Point (AP).

An enterprise environment is configured to support a hand off between a terminal and APs so as to prevent data loss by taking into consideration a Quality of Service (QoS) between the APs. However, when the hand off is generated in the enterprise environment, there occurs a problem in that it is impossible to use the Wake on WLAN set in different APs. Further, there is a problem in that in order to use the Wake on WLAN after the completion of the hand off, the Wake on WLAN needs to be reset for each newly connected AP through a negotiation, and to this end, a terminal needs to wake up from a sleep mode.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for minimizing power consumption while a terminal performs a hand off using a Wake on WLAN.

In accordance with an aspect of the present disclosure, a method of connecting to a network by a terminal in a communication system, the communication system including the terminal, one or more access points, and a network controller controlling the one or more access points, is provided. The method includes establishing a connection with a first access point, setting and storing wake-up information, configured to selectively transceive with the first access point, in the first access point and the network controller, performing hand off to a second access point connected to the network controller, and selectively transceiving data with the second access point based on the wake-up information set and stored in the network controller.

In accordance with another aspect of the present disclosure, a method of connecting to a network by a first access point in a communication system, the communication system including terminals, one or more access points, and a network controller controlling the one or more access points, is provided. The method includes establishing a connection with a first terminal, receiving wake-up information configured to selectively transceive data from the first terminal, setting the wake-up information, and storing the wake-up information in the network controller.

In accordance with another aspect of the present disclosure, a terminal device connected with one or more access points in a communication system, the communication system including the one or more access points and a network controller controlling the one or more access points, is provided. The terminal device includes a controller which controls a connection with a first access point, controls setting and storing wake-up information, configured to selectively transceive with the first access point, in the first access point and the network controller, controls hand off to a second access point connected to the network controller, and controls selective transmission/reception of data with the second access point based on the wake-up information set and stored in the network controller, and a data transceiver which transmits the data provided from the controller, and receives data from the outside and provides the received data to the controller under a control of the controller.

In accordance with another aspect of the present disclosure, an access point included in a communication system, the communication system including terminals, one or more access points, and a network controller for controlling the one or more access points, is provided. The access point includes a processor which establishes a connection with a first terminal, receives wake-up information configured to selectively transceive data from the first terminal, sets the wake-up information, and stores the wake-up information in the network controller, a data transceiver which processes transmission/reception of data with the first terminal and the network controller, and a memory which stores the wake-up information.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following detailed description taken in conjunction with the accompanying drawings, in which:

FIG. 3 is a diagram illustrating an example of a Traffic Filtering Service (TFS) request frame used in the communication method according to the embodiment of the present disclosure;

FIG. 4 is a diagram illustrating an example of a Traffic Filtering Service (TFS) response frame used in the communication method according to the embodiment of the present disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
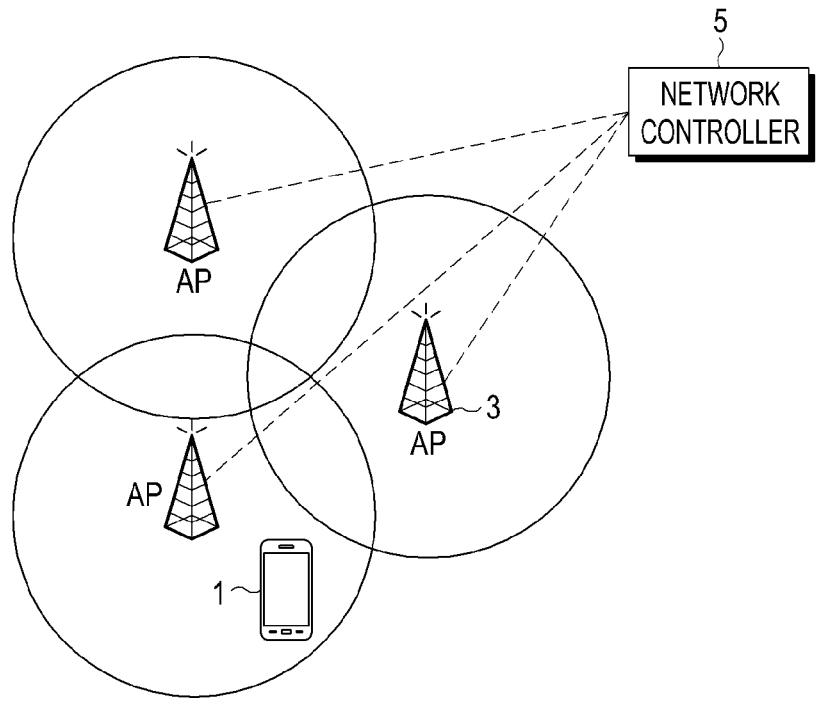
FIG. 1 is a concept diagram schematically illustrating a wireless communication system to which a communication method according to an embodiment of the present disclosure is applied.

FIG. 1 is a concept diagram schematically illustrating a wireless communication system to which a communication method according to an embodiment of the present disclosure is applied.

Referring to FIG. 1, a wireless communication system to which a communication method according to an embodiment of the present disclosure is applied includes a terminal 1, one or more Access Points (APs) 3 wirelessly connected to the terminal 1, and a network controller 5 connected to the one or more APs to operate the one or more APs.

The terminal 1 may be a device supporting data communication, for example, the terminal 1 may be a portable device, such as a laptop computer, a tablet computer, a PDA, or a mobile communication terminal, and the terminal 1 may include a Wireless LAN (WLAN) module to be connected to the Internet at a place in which the wireless AP 3 is installed. The WLAN module included in the terminal 1 and the AP 3 may use a legacy protocol, such as 802.11a, 802.11b, 802.11g, 802.11v, 802.11n, or IEEE 802.11 including an additional matter disclosed in 802.11, which are WLAN standards of the Institute of Electrical and Electronics Engineers (IEEE).

Especially, the terminal 1 and the AP 3 support a Wake on WLAN in order to solve internal power consumption generated by an operation for data transmission/reception.

The terminal 1 sets wake-up information containing information on whether to use a wake on WLAN function, a condition of data to be transceived, and a sleep section. The terminal 1 also provides the AP 3 and the network controller 5 with the set wake-up information. Further, the AP 3 sets the condition on the data to be transceived and the information on the sleep section by receiving the wake-up information so that the terminal 1 may perform the Wake on WLAN function. The AP 3 also provides the wake-up information to the network controller 5 so that the network controller 5 may manage the wake-up information.

Accordingly, when the terminal 1 performs the hand off from a currently connected AP 3 to another AP 3, the terminal 1 provides the network controller 5 with a wake-up information identifier contained in the wake-up information, and another AP 3 receiving a request of the hand off receives the wake-up information stored in the network controller 5 by using the wake-up information identifier to automatically set the wake-up information. Accordingly, an operation for separately generating or setting wake-up information after the terminal 1 performs the hand off is omitted, making it is possible to decrease power consumed for setting the wake-up information. Further, the terminal 1 performs the hand off and sets the wake-up information simultaneously, so that the terminal 1 may maintain a dormant state while performing the hand off, thereby minimizing power consumption.

Although the wireless communication system according to the embodiment of the present disclosure has been described based on the WLAN as an example, the main configuration of the present disclosure of automatically setting the wake-up information based on the wake-up information stored in an WLC without executing an operation for resetting the wake-up information after the hand off is performed may be variously applied to other communication technologies including a WPAN, as well as the WLAN.

Figure 2:
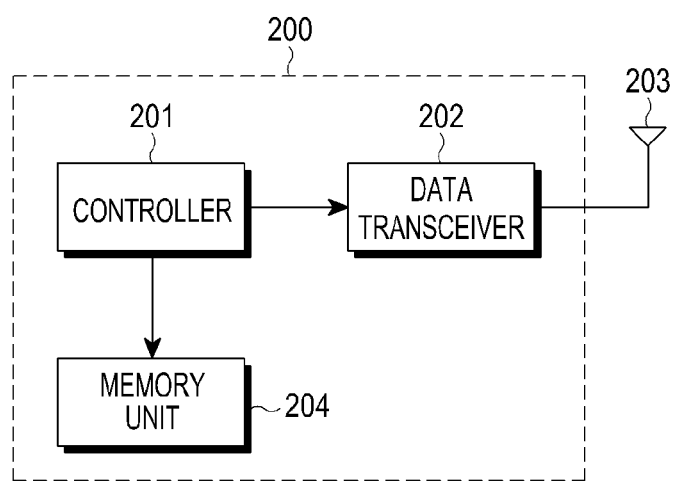
FIG. 2 is a block diagram illustrating a configuration of a terminal to which the communication method according to the embodiment of the present disclosure is applied.

FIG. 2 is a block diagram illustrating a configuration of a terminal to which the communication method according to the embodiment of the present disclosure is applied.

Referring to FIG. 2, a terminal 200 according to an embodiment of the present disclosure includes a controller 201, a data transceiver 202, an antenna 203, and a memory unit 204.

The controller 201 may provide a WLAN (for example, an IEEE 802.11 related protocol) function, and may communicate with the data transceiver 202 and the memory unit 204.

The data transceiver 202 is connected with the antenna 203 so as to transmit data provided from the controller 201 to the outside or to provide data received from the outside to the controller 201.

The controller 201 may be included in a microprocessor, be configured by individual integrated circuits, cooperate with a processor to establish communication and perform an operation, or be variously implemented by one or more integrated circuits, processors, ASICs, FPGAs, or a combination thereof, or a combination of similar devices including functionality.

The controller 201 controls the performance of the Wake on WLAN operation. Particularly, the controller 201 progresses a negotiation operation of a condition or a filter type by which the AP 3 transmits only a set frame (for example, a unicast frame or a multicast frame) for a sleep section through a Traffic Filtering Service (TFS). The controller 201 may advance the negotiation operation by transmitting a TFS request frame illustrated in FIG. 3 to the AP 3 and receiving a TFS response frame (for example, a frame illustrated in FIG. 4) in response to the TFS request frame from the AP 3.

FIG. 3 is a diagram illustrating an example of a Traffic Filtering Service (TFS) request frame used in the communication method according to the embodiment of the present disclosure.

The TFS request frame includes a TFS Action code field which indicates whether to use the TFS, and when the TFS Action code field is set as 0, the TFS Action code field indicates that the TFS is not used, and when the TFS Action code field is set as 1, the TFS Action code field indicates that the TFS is used. The TFS request frame further includes a TFS ID which indicates an identifier which is uniquely assigned for each attribute of a filter of a TS defined in a TFS sub element when setting the TFS. The TFS request frame also includes a TFS sub element field which includes information on a detailed condition or a filter type related to frame transmission. The TFS sub element field may include TCLAS element information and TCLAS processing information. The TCLAS element is an element designating the attribute of the TS as represented in Table 1 below, and may be used for making a regulation so that filtering is performed only on a frame having a desired attribute when setting the TFS.

TABLE 1

| Classifier type | Classifier parameters |
| --- | --- |
| 0 | Ethernet parameters |
| 1 | TCP/UDP IP parameters |
| 2 | IEEE 802.1 Q parameters |
| 3 | Filter Offset parameters |
| 4 | IP and higher layer parameters |
| 5 | IEEE 802.1 D/Q parameters |
| 5-255 | Reserved |

Further, the TCLAS processing element is a filter for the TFS, and is an element defining how the TFS needs to operate when multiple TCLAS elements are designated (see Table 2). When a value of the TCLAS processing element field is set as 0, the TFS is operated only when the frame satisfies all of the set multiple TCLAS elements, and when a value of the TCLAS processing element field is set as 1, the TFS is operated when the frame satisfies a minimum of one TCLAS element among the set multiple TCLAS elements.

TABLE 2

| Processing subfield value | Meaning |
| --- | --- |
| 0 | Incoming MSDU's higher layer parameters have to match to the parameters in all the associated TCLAS elements. |

TABLE 2-continued

| Processing subfield value | Meaning |
| --- | --- |
| 1 | Incoming MSDU's higher layer parameters have to match at least one of the associated TCLAS elements. |
| 2 | Incoming MSDUs that do not belong to any other TS are classified to the TS for which this TCLAS Processing element is used. In this case, there are not any associated TCLAS elements. |
| 3-255 | Reserved |

FIG. 4 is a diagram illustrating an example of a Traffic Filtering Service (TFS) response frame used in the communication method according to the embodiment of the present disclosure.

The TFS response frame includes an element ID field, a length field and a TFS status sub elements filed. The TFS status sub element filed includes a TFS Response Status field, which includes information on whether to receive information requested from the TFS request frame or not, and a reason regarding why the information requested from the TFS request frame is not received. Further, values inserted in the TFS Response Status field are represented in Table 3 below.

TABLE 3

| Value | Detailed indication contents |
| --- | --- |
| 0 | Accept |
| 1 | Denied due to malformed request or ambiguous classifier |
| 2 | Denied due to lack of resources on AP |
| 3 | Denied due to requested classifier(s) matching 2 or more existing traffic triggers |
| 4 | Denied. By policy, requested traffic filter is not permitted to participate in TFS |
| 5 | Overridden due to policy limits on AP |
| 6 | Denied. AP is unable to perform the requested action |
| 7 | Overridden due to alternate or duplicate traffic filter set on AP |
| 8~255 | Reserved |

Further, the controller 201 performs a negotiation request identified through the aforementioned process to maintain the terminal 200 in a dormant state for the sleep section and activates the terminal 200 only in a specific section for receiving a data frame transmitted based on the condition or the filter type set in the AP 3.

Especially, to prevent the repetition of the operation for resetting the wake-up information when performing the hand off, the controller 201 makes a request for storage of the wake-up information containing the negotiation result identified through the aforementioned process (the condition for data to be transceived so as to perform the Wake on WLAN function, the information on the sleep section, and the TFS ID) to the AP 3 and the network controller 5. Further, the controller 201 stores the TFS ID in the memory unit 204 so as to utilize the wake-up information stored in the network controller 5 when progressing the hand off.

In the meantime, the controller 201 may make a request for the hand off to another AP 3 by identifying a connection with the AP 3. In this case, the controller 201 provides the TFS ID stored in the memory unit 204 to the target AP 3 of the hand off. This is done so that the target AP 3 of the hand off automatically sets the wake-up information by using the wake-up information stored in the network controller 5. Further, it is preferable, but not necessary that the controller 201 inserts the TFS ID in a message requesting hand off authentication and provides the message to the target AP 3 for the hand off.

Figure 5:
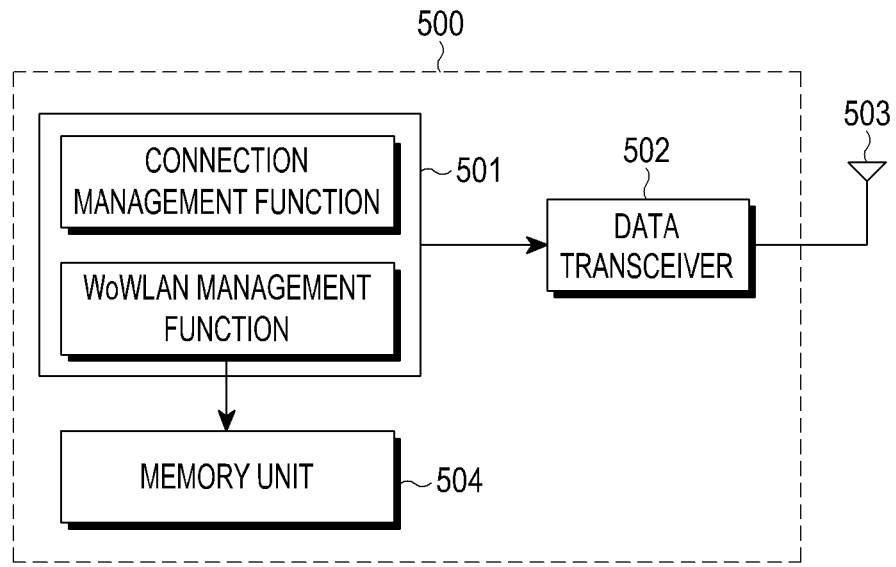
FIG. 5 is a block diagram illustrating a configuration of an access point to which the communication method according to the embodiment of the present disclosure is applied.

FIG. 5 is a block diagram illustrating a configuration of an access point to which the communication method according to the embodiment of the present disclosure is applied.

Referring to FIG. 5, an access point 500 according to the embodiment of the present disclosure includes a processor 501, a data transceiver 502, an antenna 503, and a memory unit 504.

The processor 501 may transceive data according to a protocol, such as the WLAN (for example, the protocol related to IEEE 802.11), and may communicate with the data transceiver 502 and the memory unit 504.

An operation of the data transceiver 502 is controlled by the processor 501, and is connected with the antenna 503 so as to transmit data provided from the controller 501 to the outside or to provide data received from the outside to the controller 501.

The controller 501 may be included in a microprocessor, be configured by individual integrated circuits, cooperate with a processor to establish communication and perform an operation, or be variously implemented by one or more integrated circuits, processors, ASICs, FPGAs, or a combination thereof, or a combination of similar devices including functionality.

The processor 501 may perform a connection management function managing a connection with an externally connected device (for example, a terminal 200 or a network controller 5), and perform a Wake on WLAN (WoWLAN) management function of the communication method according to the present disclosure.

For the performance of the connection management function, the processor 501 manages a connection with an external device according to a legacy protocol, such as 802.11a, 802.11b, 802.11g, 802.11v, 802.11n, or IEEE 802.11 including additional matter disclosed in 802.11, which are WLAN standards of the Institute of Electrical and Electronics Engineers (IEEE).

For the performance of the WoWLAN management function, the processor 501 performs a negotiation operation of a condition or a filter type by which the AP 3 transmits only a set frame (for example, a unicast frame or a multicast frame) for a sleep section through a Traffic Filtering Service (TFS). Particularly, the processor 501 receives the TFS request frame (see FIG. 3) from the terminal, identifies the information contained in the TFS request frame, and identifies whether it is possible to set the wake-up information according to the information contained in the TFS request frame. Further, the processor 501 transmits an identification result to the terminal through the TFS response frame (for example, the frame illustrated in FIG. 4). That is, when the TCLAS element contained in the TFS request frame indicates an acceptable state, the processor 501 sets the TFS Response Status field to 0 and makes a response, and when the TCLAS element contained in the TFS request frame indicates a denial state, the processor 501 sets the value of the TFS Response Status field in accordance with a reason of the denial, and transmits the set value to the terminal. Further, when the TCLAS element contained in the TFS request frame indicates the acceptable state, the processor 501 stores the wake-up information containing the condition of the TCLAS element in the memory unit 504, and transmits the wake-up information to the network controller 5.

In the meantime, the AP may receive a request for the hand off from the terminal connected to another AP and perform processing in response to the request. The processor 501 first performs the connection management function to perform authentication for the connection of the terminal 200, and performs the WoWLAN management function in order to set the wake-up information on the terminal 200. For the WoWLAN management function, the processor 501 transmits the TFS ID provided from the terminal 200 to the network controller 5 to make a request for provision of the wake-up information corresponding to the TFS ID. Further, the processor 501 receives the wake-up information corresponding to the TFS ID from the network controller 5, and then automatically sets the wake-up information on the terminal 200 without a separate operation with the terminal 200.

Figure 6:
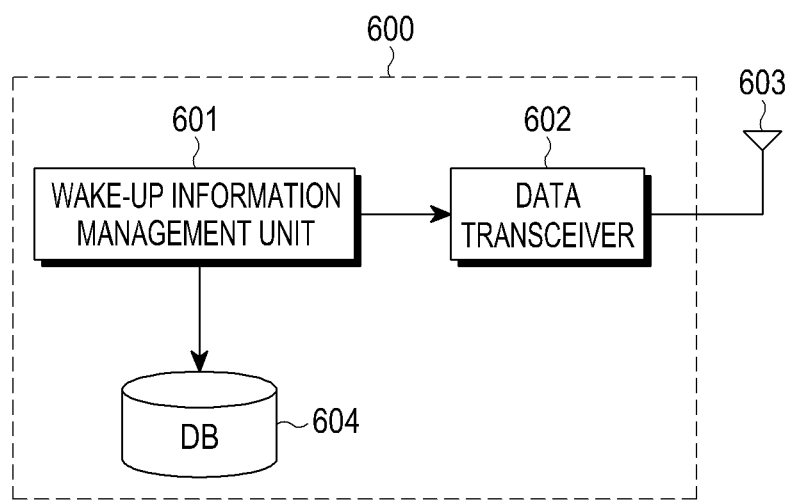
FIG. 6 is a block diagram illustrating a configuration of a network controller to which the communication method according to the embodiment of the present disclosure is applied.

FIG. 6 is a block diagram illustrating a configuration of a network controller to which the communication method according to the embodiment of the present disclosure is applied.

Referring to FIG. 6, a network controller 600 according to the embodiment of the present disclosure includes a wake-up information management unit 601, a data transceiver 602, an antenna 603, and a database unit 604.

The wake-up information management unit 601 manages a connection of the AP according to a predetermined protocol (for example, the protocol related to the IEEE 802.11v), and manages the wake-up information provided from the AP.

An operation of the data transceiver 602 is controlled by the wake-up information management unit 601, and is connected to the antenna 603 so as to transmit data provided from the wake-up information management unit 601 to the outside or to provide data received from the outside to the wake-up information management unit 601.

Especially, the wake-up information management unit 601 receives the wake-up information containing the condition, such as the TCLAS element, from the AC performing the WoWLAN management function and stores the received wake-up information in the database unit 604.

Further, the wake-up information management unit 601 is operated so as to provide the wake-up information to another target AP of the hand off so that the terminal 200 may omit the operation of separately generating or setting the wake-up information through transmission/reception data with the AP when performing the hand off. Particularly, the wake-up information management unit 601 receives the TFS ID from the target AP of the hand off connected to the network controller 600, and receives a request to provide wake-up information related to the TFS ID. In response to this request, the wake-up information management unit 601 extracts the wake-up information corresponding to the received TFS ID among the wake-up information stored in the database 604 and provides the extracted wake-up information to the AP making the request for the wake-up information.

Hereinafter, operations of the devices to which the communication method according to the embodiment of the present disclosure is applied will be specifically described while describing the communication method according to the embodiment of the present disclosure.

Figure 7A:
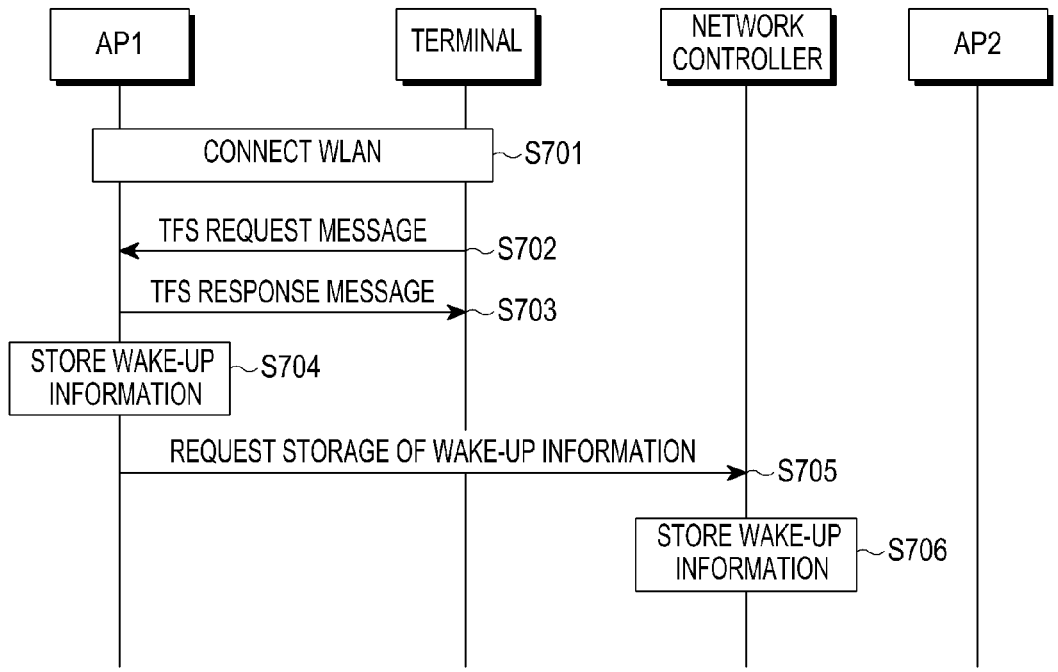
FIG. 7A is a signal flow diagram for an operation of storing wake-up information in the network controller in the wireless communication system to which the communication method according to the embodiment of the present disclosure.
Figure 7B:
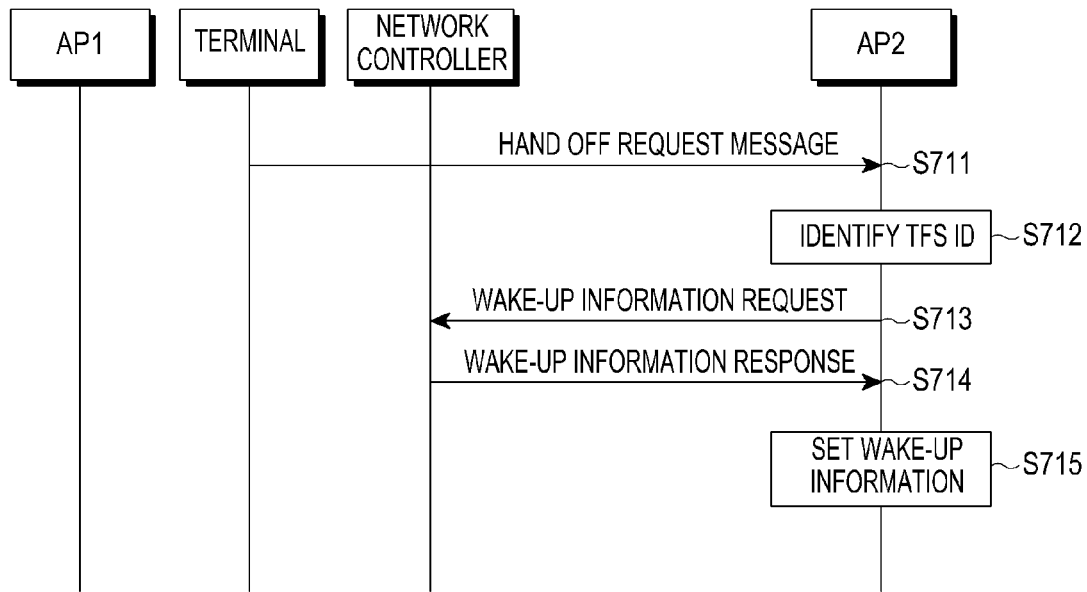
FIG. 7B is a signal flow diagram for a hand off operation in the wireless communication system to which the communication method according to the embodiment of the present disclosure is applied.

FIGS. 7A and 7B illustrate examples of signal flow diagrams of the communication method according to the embodiment of the present disclosure.

FIG. 7A is a signal flow diagram for an operation of storing wake-up information in the network controller in the wireless communication system to which the communication method according to the embodiment of the present disclosure is applied.

FIG. 7B is a signal flow diagram for a hand off operation in the wireless communication system to which the communication method according to the embodiment of the present disclosure is applied.

Referring to FIG. 7A, in order to store wake-up information in the network controller, in step S701, first, a connection between the terminal 200 and the AP 500 is established. Particularly, when the controller 201 of the terminal 200 transmits a registration request message making a request for registration to the AP 500 based on a predetermined wireless communication protocol (for example, a protocol related to the IEEE 802.11), the AP 500 receives the registration request message through the data transceiver 502 connected to the antenna 503 and transfers the received registration request message to the processor 501. Accordingly, the processor 501 identifies whether the connection of the terminal 200 is authorized by identifying information contained in the registration request message, generates a registration response message including the result of the authentication, and transmits the generated registration response message to the terminal 200 through the data transceiver 502 and the antenna 503.

Next, the terminal 200 processes a setting for the Wake on WLAN operation with the AP 500. That is, the controller 201 generates a TFS request message (see FIG. 3) illustrated in FIG. 3 and transmits the generated TFS request message to the AP 500 through the data transceiver 202 and the antenna 203 at operation S702. In response to this, the AP 500 receives the TFS request message through the antenna 503 and the data transceiver 502, the processor 501 identifies the wake-up information contained in the TFS request message, for example, whether the TCLAS element is in an acceptable state. When the TCLAS element is in the acceptable state, the processor 501 sets the TFS Response Status field as 0 and returns the setting. Meanwhile, when the TCLAS element is in a denial state, the processor 501 sets the value of the TFS Response Status field in accordance with a reason, and transmits the set value to the terminal 200 through the data transceiver 502 and the antenna 503 at operation S703.

Then, the controller 201 controls the terminal 200, so that the terminal 200 remains in a dormant state during a sleep section of the terminal 200 according to a negotiation result of the aforementioned process, and the terminal 200 is activated only in a necessary section for receiving the data frame transmitted based on a condition or a filter type contained in the wake-up information. Further, the processor 501 of the AP 500 determines data transmission/reception, and notifies the terminal 200 of the section requiring the data transmission/reception so that the terminal 200 is activated.

Next, the processor 501 stores the wake-up information containing the condition, such as the TCLAS element, in the memory unit 504 in a case where the TCLAS element contained in the TFS request message is in the acceptable state at operation S704, and transmits the wake-up information to the network controller 600 so that the wake-up information is stored in the network controller 600 at operation S705.

Next, the network controller 600 receives the wake-up information containing the condition, such as the TCLAS element, from the AP 600 through the data transceiver 602 connected with the antenna 603 and identifies the received wake-up information, and stores the wake-up information in the database 604 at operation S706.

In the meantime, referring to FIG. 7B, the controller 201 identifies whether to perform the hand off by monitoring a situation of a channel connected with the AP 500. When determined that the hand off is necessary, the controller 201 transmits a hand off request message to a target AP of the hand off at operation S711. In this case, the controller 201 provides a TFS ID stored in the memory unit 204 to the target AP of the hand off, and permits another AP 500 to automatically set the wake-up information by using the wake-up information stored in the network controller.

The processor 501 included in the AP 500 receives a hand off request message from the terminal 200, performs authentication for the connection of the terminal 200 by primarily performing the connection management function, and primarily identifies the TFS ID received in the hand off request message in order to perform the WoWLAN management function for setting the wake-up information for the terminal 200 at operation S712.

Next, the processor 501 transmits a wake-up information request message containing the identified TFS ID to the network controller 600 and makes a request for provision of the wake-up information corresponding to the TFS ID at operation S713.

Accordingly, the wake-up information management unit 601 included in the network controller 600 identifies the TFS ID contained in the wake-up information request message, extracts the wake-up information corresponding to the received TFS ID among wake-up information stored in the database unit 604, and then inserts a result of the extraction in the wake-up information response message and transmits the wake-up information response message to the AP 500 at operation S714.

The processor 501 included in the AP 500 receives the wake-up information corresponding to the TFS ID from the network controller 600, automatically sets the wake-up information on the terminal 200 without performing a separate operation with the terminal 200, recovers the wake-up information, i.e., the condition of the TCLAS element, set in the connected AP before the terminal 200 performs the hand off, and sets the recovered wake-up information to the target AP 500 of the hand off at operation S715.

Accordingly, the processor 601 of the AP 500 determines data transmission/reception based on the condition or the filter type contained in the wake-up information, and performs the Wake on WLAN function, such as notification of the terminal 200 with a necessary section requiring data transmission/reception so that the terminal 200 is activated in the necessary section. Accordingly, in a situation where the hand off is generated by the terminal 200 and the AP 500, even though the terminal 200 does not perform the operation of making a setting with the AP 500 after performing the hand off of the wake-up information of which the setting is already completed before the generation of the hand off, the AP 500 may automatically set the wake-up information and perform the Wake on WLAN function.

Figure 8:
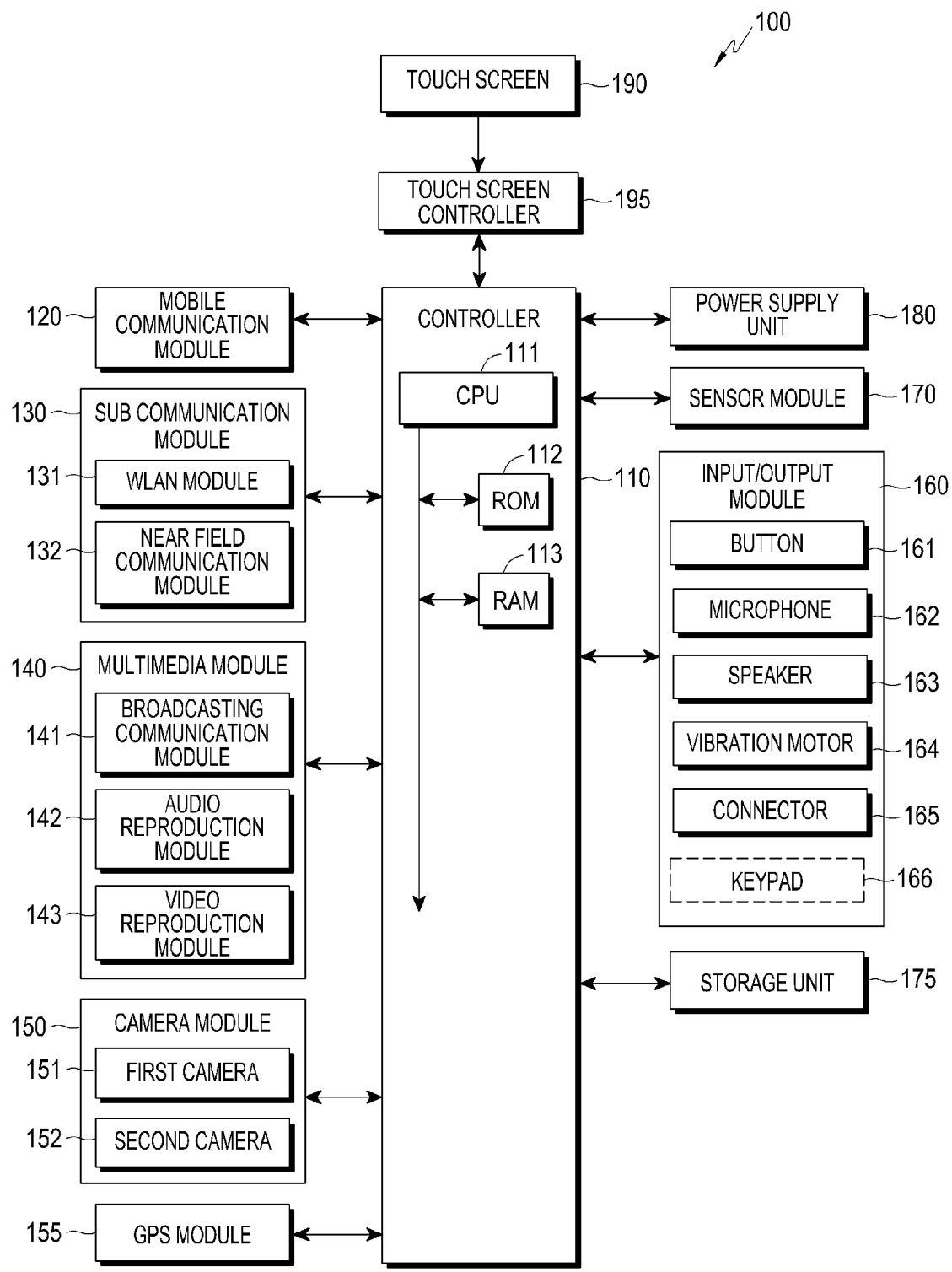
FIG. 8 is a schematic block diagram illustrating a mobile terminal to which the communication method according to the embodiment of the present disclosure is applied.

FIG. 8 is a schematic block diagram illustrating a mobile terminal to which the communication method according to the embodiment of the present disclosure is applied.

Referring to FIG. 8, the mobile terminal 100 may be connected to an external device (not shown) by using a mobile communication module 120, a sub communication module 130, and a connector 165. The "external device" includes another device (not shown), a portable phone (not shown), a smart phone (not shown), a tablet PC (not shown), and a server (not shown).

The mobile terminal 100 includes a touch screen 190 and a touch screen controller 195. Further, the device 100 includes a controller 110, the mobile communication module 120, the sub communication module 130, a multimedia module 140, a camera module 150, a GPS module 155, an input/output module 160, a sensor module 170, a storage unit 175, and a power supply unit 180. The sub communication module 130 includes at least one of a WLAN module 131 and a near field communication module 132, and the multimedia module 140 includes at least one of a broadcasting communication module 141, an audio reproduction module 142, and a video reproduction module 143. The camera module 150 includes at least one of a first camera 151 and a second camera 152. The input/output module 160 includes at least one of buttons 161, a microphone 162, a speaker 163, a vibration motor 164, a connector 165, and a keypad 166, which is optional.

The controller 110 may include a ROM 112 for storing a control program for controlling the device 100, and a RAM 113 for storing a signal or data input from the outside of the device 100 or used as a memory region for work performed by the device 100. The CPU 111 may include a single core, a dual core, a triple core, or a quad core processor or any other type of suitable processor. The CPU 111, the ROM 112, and the RAM 113 may be interconnected through an internal bus.

The controller 110 may control the mobile communication module 120, the sub communication module 130, the multimedia module 140, a camera module 150, a GPS module 155, the input/output module 160, a sensor module 170, the storage unit 175, the power supply unit 180, first and second touch screens 190, and a touch screen controller 195.

The mobile communication module 120 permits the device 100 to be connected with an external device through mobile communication using one or more antennas (not shown) according to the control of the controller 110. The mobile communication module 120 transceives a wireless signal for voice call, video call, and Short Message Services (SMS) or Multimedia Message Service (MMS) with a portable phone (not shown) having a telephone number input in the device 100, a smart phone (not shown), a tablet PC, or another device (not shown).

The sub communication module 130 may include at least one of the WLAN module 131 and the near field communication module 132. For example, the sub communication module 130 may include only the WLAN module 131, only the near field communication module 132, or both the WLAN module 131 and the near field communication module 132.

The WLAN module 131 may be connected to the Internet at a place in which a wireless AP (not shown) is installed according to the control of the controller 110. The WLAN module 131 supports the WLAN standard (IEEE802.11x) of the Institute of Electrical and Electronics Engineers (IEEE). The near field communication module 132 may wirelessly perform near field communication between the device 100 and an image forming device (not shown) according to the control of the controller 110. The near field communication method may include Bluetooth, Infrared Data Association (IrDA), and the like.

The device 100 may further include at least one of the mobile communication module 120, the WLAN module 131, and the near field communication module 132. For example, the device 100 may include a combination of the mobile communication module 120, the WLAN module 131, and the near field communication module 132 according to performance thereof.

The multimedia module 140 may include the broadcasting module 141, the audio reproduction module 142, or the video reproduction module 143. The broadcasting communication module 141 may receive a broadcasting signal (for example, a TV broadcasting signal, a radio broadcasting signal, or a data broadcasting signal) transmitted from a broadcasting station through a broadcasting communication antenna (not shown) through the control of the controller 110, and broadcasting added information (for example, an Electric Program Guide (EPS) or an Electric Service Guide (ESG)). The audio reproduction module 142 may reproduce a stored or received digital audio file (for example, a file having a file extension of mp3, wma, ogg, or way) according to the control of the controller 110. The video reproduction module 143 may reproduce a stored or received digital video file (for example, a file having a file extension of mpeg, mpg, mp4, avi, mov, or mkv) according to the control of the controller 110. The video reproduction module 143 may reproduce a digital audio file.

The multimedia module 140 may include the audio reproduction module 142 and the video reproduction module 143, except for the broadcasting communication module 141. Further, the audio reproduction module 142 or the video reproduction module 143 of the multimedia module 140 may be included in the controller 100.

The camera module 150 may include at least one of the first camera 151 and the second camera 152 photographing a still image or a video according to the control of the controller 110. Further, the first camera 151 or the second camera 152 may include an auxiliary light source (for example, a flash (not shown) for providing a quantity of light necessary for photographing). The first camera 151 may be disposed on a front surface of the device 100 and the second camera 152 may be disposed on a rear surface of the device 100. Alternatively, the first camera 151 and the second camera 152 may be adjacently disposed (an interval between the first camera 151 and the second camera 152 is larger than 1 cm and smaller than 8 cm) to photograph a three-dimensional still image or a three-dimensional video.

The GPS module 155 may receive radio waves from a plurality of GPS satellites (not shown) in orbit around the earth, and calculate a position of the device 100 by using a time of arrival of the radio waves from the GPS satellites (not shown) to the device 100.

The input/output module 160 may include a plurality of buttons 161, the microphone 162, the speaker 163, the vibration motor 164, the connector 165, and the keypad 166 or any variation thereof.

The button 161 may be formed on a front surface, a side surface, or a rear surface of a housing of the device 100, and may include at least one among a power/lock button (not shown), a volume button (not shown), a menu button (not shown), a home button (not shown), a back button (not shown), and a search button (not shown).

The microphone 162 receives voice or sound to generate an electrical signal according to the control of the controller 110.

The speaker 163 may output sounds corresponding to various signals (for example, a wireless signal, a broadcasting signal, a digital audio file, a digital video file, or photographing) of the mobile communication module 120, the sub communication module 130, the multimedia module 140, or the camera module 150 to the outside of the device 100 according to the control of the controller 110.

The speaker 163 may output a sound (for example, a button operation sound or a call connection sound corresponding to a phone call) corresponding to the function performed by the device 100. One or a plurality of speakers 163 may be formed at an appropriate position or appropriate positions of the housing of the device 100.

The vibration motor 164 may convert an electrical signal into a mechanical vibration according to the control of the controller 110. For example, when the device 100 in a vibration mode receives a voice call from another device (not shown), the vibration motor 164 is operated. One or a plurality of vibration motors 164 may be formed inside the housing of the device 100. The vibration motor 164 may be operated in response to a touch motion of a user touching the touch screen 190 and/or a continuous touch on the touch screen 190.

The connector 165 may be used as an interface for connecting the device 100 and an external device (not shown) or a power source (not shown). The connector 165 may transmit data stored in the storage unit 175 of the device 100 to an external device (not shown) or receive data from an external device (not shown) through a wired cable connected to the connector according to the control of the controller 110. The power is input from the power source (not shown) or a battery (not shown) of the terminal 100 may be charged through the wired cable connected to the connector 165.

The keypad 166 may receive a key input from a user for controlling the device 100. The keypad 166 includes a physical keypad (not shown) formed in the device or a virtual keypad (not shown) displayed on the touch screen 190. The physical keypad (not shown) formed in the device 100 may be excluded according to performance or a structure of the device 100.

The sensor module 170 includes at least one sensor detecting a state of the device 100. For example, the sensor module 170 may include a proximity sensor detecting proximity of an object to the device 100 of the user, an illumination sensor (not shown) detecting a quantity of light around the device, or a motion sensor (not shown) detecting an operation of the device (for example, a rotation of the device 100, and an acceleration or a vibration applied to the rotation 100). At least one sensor may detect a state, generate a signal corresponding to the detection, and transmit the generated signal to the controller 110. The sensor of the sensor module 170 may be added or deleted according to performance of the device 100.

The storage unit 175 stores signals or data input/output in accordance with an operation of the mobile communication module 120, the sub communication module 130, the multimedia module 140, the camera module 150, the GPS module 155, the input/output module 160, the sensor module 170, or the touch screen 190. The storage unit 175 may store control programs or applications for controlling the device 100 or the controller 110.

The term "storage unit" includes the storage unit 175, the ROM 112 or the RAM 113 within the controller 110, or a memory card (not shown) (for example, an SD card, and a memory stick) mounted in the device 100. The storage unit may include a nonvolatile memory, a volatile memory, a Hard Disk Drive (HDD), or a Solid State Drive (SSD).

The power supply unit 180 may supply power to the terminal 100 according to the control of the controller 110 and the power supply unit 180 may include one or more batteries (not shown) disposed in the housing of the device 100. Further, the power supply unit 180 may supply the power input from the external power source (not shown) through the wired cable connected with the connector 165 to the device 100.

The touch screen 190 may provide a user with user interfaces corresponding to various services (for example, a call, data transmission, broadcasting, and photographing). The touch screen 190 may transmit an analog signal corresponding to at least one touch input in the user interface to the touch screen controller 195. The touch screen 190 may receive at least one touch from a body of the user (for example, a finger including a thumb) or an input for making a touch (for example, a stylus pen). Further, the touch screen 190 may receive a continuous movement of one touch among one or more touches. The touch screen 190 may transmit an analog signal corresponding to the continuous movement of the input touch to the touch screen controller 195.

The touch in the present disclosure is not limited to a contact between the touch screen 190 and the body of the user or the input for making a touch, and may include a noncontact (for example, an interval between the touch screen 190 and the body of the user or the input for making a touch is equal to or lower than 1 mm) A detectable interval by the touch screen 190 may be changed according to performance or a structure of the device 100.

The touch screen 190 may be implemented, for example, by a resistive method, a capacitive method, an infrared method, or an ultrasonic wave method or other methods.

The touch screen controller 195 converts an analog signal received from the touch screen 190 into a digital signal (for example, X and Y coordinates) and transmits the converted digital signal to the controller 110. The controller 110 may control the touch screen 190 by using the digital signal received from the touch screen controller 195. For example, the controller 110 may permit a shortcut icon (not shown) displayed on the touch screen 190 to be selected or execute a shortcut icon (not shown) in response to the touch. Further, the touch screen controller 195 may be included in the controller 110.

Especially, the WLAN module 131 may be operated as a terminal to which the communication method according to the embodiment of the present disclosure is applied, and may include the controller 201, the data transceiver 202, the antenna 203, and the memory unit 204.

In the present disclosure, the terminal may recover the wake-up information without an additional setting for the Wake on WLAN with a previous AP even in the hand off situation.

In the present disclosure, it is possible to reduce power consumption and to reduce a decrease in network efficiency caused by the frequent use of the set Wake on WLAN whenever the hand off is generated.

According to the present disclosure, it is possible to reduce power consumption by decreasing a time in which the terminal is unnecessarily woken up and operated for the resetting of the Wake on WALN, and to improve efficiency of a network by omitting an exchange of a network message which needs to be repeated for the resetting of the Wake on WLAN.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of connecting to a network by a terminal in a communication system, the communication system including the terminal, one or more access points, and a network controller controlling the one or more access points, the method comprising:
    establishing a connection to a first access point;
    setting wake-up information configured to selectively transceive data with the first access point;
    performing a negotiation for a function for selectively transceiving data based on the set wake-up information with the first access point;

transmitting the set wake-up information to the first access point and the network controller according to the negotiation for the function;
selectively transceiving data with the first access point based on the function that is negotiated;
performing hand off to a second access point connected to the network controller; and
selectively transceiving data with the second access point performing the function based on the wake-up information stored in the network controller, without performing negotiation of the function with the second access point,
wherein the terminal transmits, to the second access point, information related to the function to receive the stored wake-up information from the network controller when requesting the hand off to the second access point.

2. The method of claim 1, wherein the wake-up information includes a type of data to be selectively transceived, wake-up section information indicating an operation section of an operation/dormant mode, and a wake-up information identifier identifying a wake-up information setting.

3. The method of claim 2, wherein the setting of the wake-up information includes making a request for setting the type of data and the wake-up section information in the first access point, and storing the wake-up information identifier contained in the wake-up information in the first access point.

4. The method of claim 2, wherein the setting of the wake-up information includes making a request for storing the type of data, the wake-up section information, and the wake-up information identifier in the network controller.

5. The method of claim 2, wherein the performing of the hand off to the second access point includes:
transmitting a message making a request for authentication of the hand off including the wake-up information identifier to the second access point so that the second access point identifies validity of the wake-up information setting with the network controller through the wake-up information identifier; and
receiving a result of the request for the authentication of the hand off and a result of the wake-up information setting from the second access point.

6. A terminal device connected with one or more access points in a communication system, the communication system including the one or more access points and a network controller controlling the one or more access points, the terminal device comprising:
a controller configured to:
connect with a first access point,
set wake-up information configured to selectively transceive data with the first access point,
perform a negotiation for a function for selectively transceiving data based on the set wake-up information with the first access point,
transmit the set wake-up information to the first access point and the network controller according to the negotiation for the function;
selectively transceive data with the first access point based on the function that is negotiated,
hand off to a second access point connected with the network controller, and
selectively transceive data with the second access point performing the function based on the wake-up information stored in the network controller, without performing negotiation of the function with the second access point; and
a data transceiver configured to transmit the data provided from the controller, and to receive data from the outside and provide the received data to the controller under control of the controller,
wherein the controller is further configured to transmit, to the second access point, information related to the function to receive the wake-up information from the network controller when requesting the hand off to the second access point.

7. The terminal device of claim 6, wherein the wake-up information includes a type of data to be selectively transceived, wake-up section information indicating an operation section of an operation/dormant mode, and a wake-up information identifier identifying a wake-up information setting.

8. The terminal device of claim 7, wherein the controller is further configured to:
set the type of the data and the wake-up section information in the first access point,
generate a message making a request for storing the wake-up information identifier contained in the wake-up information in the first access point, and
transmit the generated message to the first access point.

9. The terminal device of claim 7, wherein the controller is further configured to make a request for storing the type of the data, the wake-up section information, and the wake-up information identifier in the network controller.

10. The terminal device of claim 7, wherein the controller is further configured to transmit a message making a request for authentication of the hand off including the wake-up information identifier to the second access point so that the second access point identifies validity of the wake-up information setting with the network controller through the wake-up information identifier.

* * * * *